C. H. HAPGOOD.
DASH POT.
APPLICATION FILED NOV. 6, 1915.
1,280,720.
Patented Oct. 8, 1918.
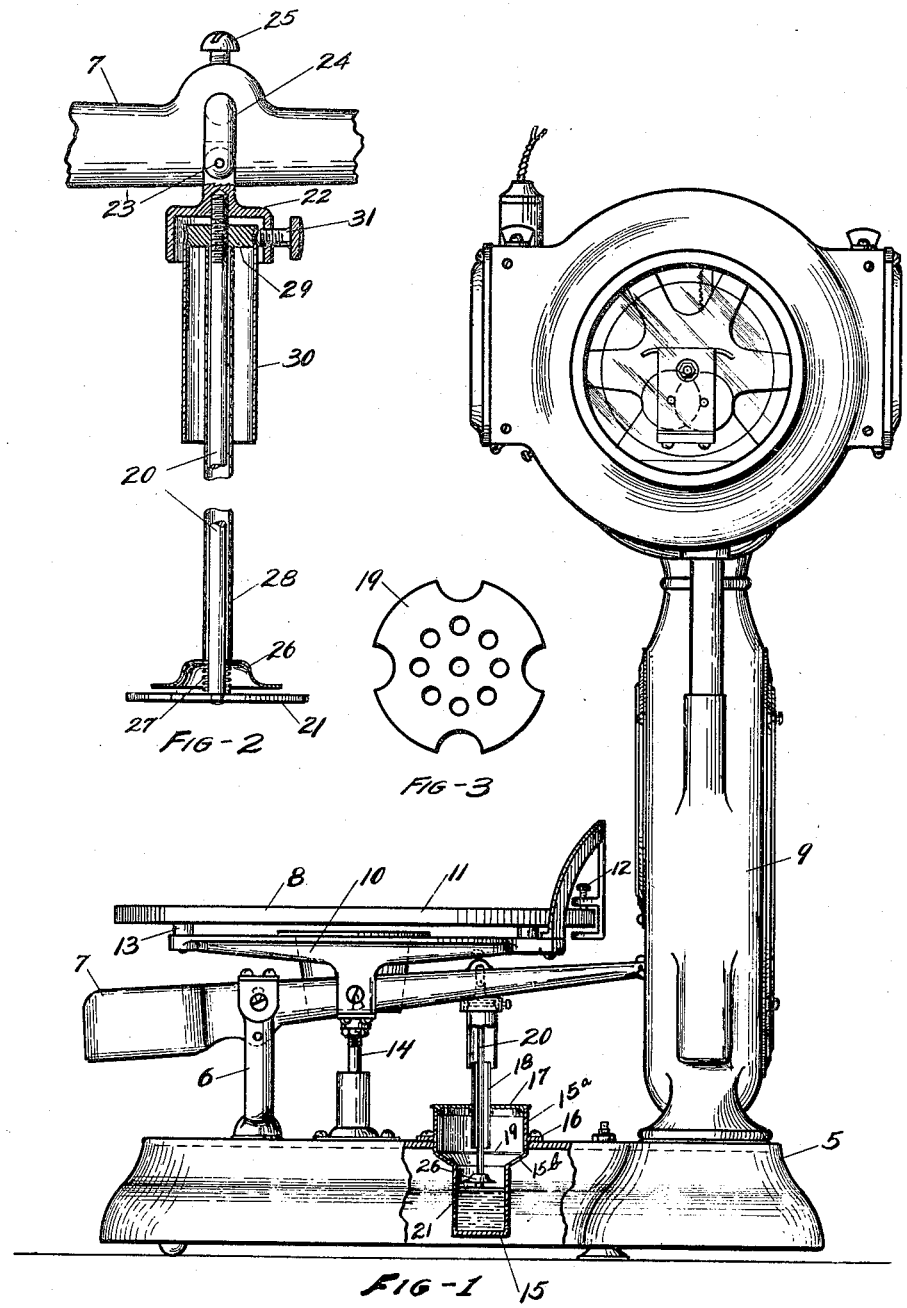
WITNESSES.
Edw. F. Ulrich.
C. J. Jinke
INVENTOR
Clarence H. Hapgood.
BY George R. Frye
ATTORNEY though the commodity being weighed be placed upon the receiver carelessly or with intentional violence. The dash-pot which forms the subject matter of the present application is particularly adapted to accomplish this regulation of the movement of the beam and lever mechanism of an automatic scale, though obviously it may be used in other connections where similar regulation is to be effected, and certain of its principles and features are applicable to dash-pots in general, as will more fully appear from the following detailed description of a preferred embodiment of my invention illustrated in the accompanying drawings. As will appear, my invention involves an improved form of dasher or piston in which the damping effect may be readily controlled by manual adjustment while also susceptible to an automatic regulation in accordance with the violence or speed of movement to which it is subjected. A further feature of my invention consists in providing a splash plate limited in its movement and arranged to prevent the pumping or splashing of oil upwardly in such volume and with such velocity as to cause it to overflow or splash out of the dash-pot.

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

DASH-POT.

1,280,720.  Specification of Letters Patent.  Patented Oct. 8, 1918.

Application filed November 6, 1915. Serial No. 59,923.

*To all whom it may concern:*

Be it known that I, CLARENCE H. HAPGOOD, a citizen of the United States, residing at Toledo, in the county of Lucas and State of Ohio, have invented certain new and useful Improvements in Dash-Pots, of which the following is a specification.

My invention relates to dash-pots or similar shock-absorbing devices, and is particularly designed for use in automatic weighing scales. It is desirable to dampen and regulate the movement of the main beam and lever mechanism of an automatic weighing scale so as to prevent the transmission of shock from the commodity receiver to the load-counterbalancing mechanism, even though the commodity being weighed be placed upon the receiver carelessly or with intentional violence. The dash-pot which forms the subject matter of the present application is particularly adapted to accomplish this regulation of the movement of the beam and lever mechanism of an automatic scale, though obviously it may be used in other connections where similar regulation is to be effected, and certain of its principles and features are applicable to dash-pots in general, as will more fully appear from the following detailed description of a preferred embodiment of my invention illustrated in the accompanying drawings. As will appear, my invention involves an improved form of dasher or piston in which the damping effect may be readily controlled by manual adjustment while also susceptible to an automatic regulation in accordance with the violence or speed of movement to which it is subjected. A further feature of my invention consists in providing a splash plate limited in its movement and arranged to prevent the pumping or splashing of oil upwardly in such volume and with such velocity as to cause it to overflow or splash out of the dash-pot.

With the above and other objects in view, which will readily appear as the invention is better understood, my invention consists in the novel construction, combination and arrangement of parts to be hereinafter more fully described and particularly pointed out in the subjoined claims.

Reference is to be had to the accompanying drawings illustrating a preferred embodiment of my invention and wherein similar reference numerals designate similar parts throughout the several views.

In the drawings:—

Figure 1 is a side elevation with parts in section of a weighing scale equipped with a dash-pot embodying my invention.

Fig. 2 is an enlarged detail sectional view of the piston and associated parts, and Fig. 3 is a plan view of the splasher plate.

It will not be necessary to give a detail description of the particular type of weighing scale here chosen for the purpose of illustrating the preferred embodiment of my invention, because that type of scale is well known through extensive commercial use, and is described in detail in my Patent No. 1,166,128, issued December 28, 1915, of which this application is in part a continuation. Inasmuch as the present invention is not dependent for its operation upon any particular form of scale mechanism, no attempt is made in this application to show a complete scale mechanism, nor to delineate the action of the scale in its load-counterbalancing or weighing operations; only so much of the scale mechanism being shown as is necessary to clearly portray the operation and co-action of the scale mechanism with the features forming the claimed invention herein disclosed.

Referring to the drawings, 5 designates a suitable scale base carrying standards 6 on which is fulcrumed a scale beam 7 supporting a scale pan or other commodity receiver 8 and connected within a housing 9 with a pendulum load-counterbalancing mechanism (not shown) which is so connected and arranged as to swing in a vertical plane to a position offsetting the weight of a commodity placed upon the scale pan 8. The scale pan 8 preferably consists of the usual casting 10 supporting a disk 11 of glass or other suitable material clamped in place by means of a thumb screw 12 and resting upon supports 13 of rubber or other suitable material. To maintain the scale pan in substantially horizontal position, the casting is provided with a depending check-rod 14, the lower end of which is pivotally connected within the base 5 with a check-link (not shown) of any approved type. The casting 10 supporting the scale pan rests upon the scale beam 7 inwardly of the fulcrum pivots, and the weight of a commodity placed upon the scale pan will tend to move the inner end of the scale beam downwardly. A rack-rod (not shown) is suitably connected with the scale beam within the housing 9, the rack thereof meshing with a pinion suitably mounted upon a shaft carrying the rotary cylindrical chart on which is preferably inscribed figures indicating weights and computations at various prices per unit of weight. The features just referred to are common and well known in the scale art and need not be herein specifically described. My dash-pot consists of a cylinder 15 having an enlarged upper portion 15$^a$ extending through an opening in the top of the base 5 and secured to said base by means of set screws passing through apertures in a flange 16 carried by the cylinder (see Fig. 1). A cap 17 is preferably threaded upon the upper extremity of the cylinder 15 and is formed with an enlarged central aperture through which extends an elongated sleeve 18 adapted to project for some distance on both sides of the cap or cover 17 to assist in preventing the accidental splashing of the oil from the cylinder. A perforated splasher plate 19 is also provided for the prevention of the pumping or splashing of oil from the cylinder, and is arranged to rest upon a shoulder 15$^b$ formed in the cylinder 15 by the enlargement 15$^a$, and is limited in its upward movement by the lower extremity of the sleeve 18, which is arranged to extend into juxtaposition to the splasher plate.

The plunger rod or stem 20 is preferably of smaller diameter than the sleeve 18 to allow limited lateral or swinging movements of the plunger 21, and is provided with screw-threads at its upper extremity adapted to fit into a threaded aperture in the cap plate 22 (see Fig. 2). The cap plate 22 is pivotally connected at its upper extremity, as at 23, to the bracket arm 24 which is secured to the main beam 7 by the set screw 25 or other suitable means. The plunger or piston 21 consists of a perforated disk above which is positioned an adjustable bell 26 of smaller diameter than the cylinder and loosely encircling the plunger rod 20, a coil spring 27 being arranged between the bell and plunger, as clearly shown in Fig. 2. An elongated sleeve 28, the lower end of which rests upon the bell 26, surrounds the plunger rod 20 and the upper end of said sleeve is contacted by an adjusting nut 29 threaded upon the upper extremity of the plunger rod 20. A sleeve 30 is secured to the periphery of the nut 29 to facilitate the rotation of this nut and render it accessible for manual adjustment without the necessity of employing an instrument. A locking screw 31 is threaded into the cap plate 22 and contacts with the sleeve 30 to hold the nut 29 in any adjusted position (see Fig. 2).

In the operation of the scale, whenever a load is placed upon the scale pan 8 the inner end of the scale beam 7 is depressed, raising the pendulum mechanism and forcing the plunger rod 20 of the dash-pot downwardly from the position shown in Fig. 1, the liquid in the dash-pot cylinder being forced through apertures in the plunger 21 and under the peripheral edge of the bell 26, the rapidity of movement of the plunger being governed by the position of the bell with relation to the upper face of the plunger. To adjust the position of the bell it is only necessary to loosen the locking screw 31 and rotate the sleeve 30 and the attached nut 29. Rotation of the sleeve in one direction will serve to force the bell 26 toward the plunger 21 against the tension of the coil spring 27, while rotation of the sleeve 30 in the opposite direction permits the coil spring 27 to move the bell 26 and the spacing sleeve 28 upwardly or away from the plunger 21. When the desired adjustment has been made the locking screw 31 is again turned to locking position. When the commodity is removed from the scale pan the fall of the pendulum to its original position will serve to raise the inner end of the scale beam and the plunger rod 20, the liquid in the dash-pot passing under the edge of the bell 26 and through the apertures in the piston.

While it will be apparent from the above description that the illustrated embodiment of my invention is well calculated to adequately fulfil the objects of the invention primarily stated, it will be understood that the construction shown is susceptible to modification, variation and change without departing from the spirit and scope of the invention as set forth in the subjoined claims.

Having described my invention, I claim:

1. In a dash-pot, a cylinder containing liquid, a reciprocating plunger and plunger rod, and a splash plate surrounding the plunger rod above the level of the liquid in the dash-pot.

2. In a dash-pot, a cylinder containing liquid, a reciprocating plunger and plunger rod, and a perforated splash plate loosely surrounding the plunger rod above the level of the liquid in the dash-pot.

3. In a dash-pot, a cylinder adapted to contain liquid and having a shoulder above the level of the liquid, a reciprocating plunger and plunger rod, and a splash plate surrounding the plunger rod and resting upon the shoulder.

4. In a dash-pot, a cylinder, a plunger rod, a piston secured thereto, a bell loosely surrounding the plunger rod, resilient means for spacing the bell from the piston, adjusting means coöperating with said resilient means for positioning the bell with relation to the piston, including a sleeve contacting the bell, and means for moving the sleeve longitudinally of the plunger rod.

5. A dash-pot comprising a cylinder, a piston, a plunger rod secured to the piston and provided with screw-threads, a bell surrounding the plunger rod, and means for adjusting the position of the bell relatively to the piston, including a sleeve loosely surrounding the plunger rod and engaging the bell, and an adjusting nut threaded upon the plunger rod and contacting said sleeve.

6. A dash-pot comprising a cylinder, a piston, a plunger rod secured to the piston and provided with screw-threads, a bell surrounding the plunger rod, and means for adjusting the position of the bell relatively to the piston, including a sleeve loosely surrounding the plunger rod and engaging the bell, an adjusting nut threaded upon the plunger rod and contacting said sleeve, and resilient means arranged between the piston and the bell and engaging the latter.

7. A dash-pot comprising a cylinder having a lower portion adapted to contain liquid and an upper portion of greater diameter than the lower portion providing a shoulder between the two portions, a piston, a plunger rod secured thereto, a bell surrounding the plunger rod and spaced from the piston, means for adjusting the position of the bell with relation to the piston, including a sleeve surrounding the plunger rod and engaging the bell means for moving the sleeve longitudinally of the plunger rod, and a splasher plate loosely surrounding said sleeve and resting upon the shoulder of the cylinder.

8. In a device of the class described, a movable element and a fixed element, a dash pot secured to the fixed element, a cover therefor having an upwardly-extending sleeve, a plunger within the dash pot, a plunger rod connecting the plunger to the movable element, and a sleeve upon the plunger rod closed at its upper end and surrounding the sleeve upon the dash pot cover.

CLARENCE H. HAPGOOD.

Witness:
K. E. HAYES.